United States Patent
Sukumar et al.

(10) Patent No.: US 12,142,054 B2
(45) Date of Patent: Nov. 12, 2024

(54) VEHICLES, SYSTEMS AND METHODS FOR DETERMINING AN OCCUPANCY MAP OF A VICINITY OF A VEHICLE

(71) Applicant: Aptiv Technologies AG, Schaffhausen (CH)

(72) Inventors: Premnaath Sukumar, Wuppertal (DE); Aniello Sorrentino, Wuppertal (DE); Alexander Ioffe, Bonn (DE)

(73) Assignee: Aptiv Technologies AG, Schaffhausen (CH)

( * ) Notice: Subject to any disclaimer, the term of this patent is extended or adjusted under 35 U.S.C. 154(b) by 590 days.

(21) Appl. No.: 17/460,895

(22) Filed: Aug. 30, 2021

(65) Prior Publication Data
US 2022/0067395 A1    Mar. 3, 2022

(30) Foreign Application Priority Data

Aug. 31, 2020 (EP) .................................... 20193680
Aug. 11, 2021 (EP) .................................... 21190812

(51) Int. Cl.
*G06T 7/73* (2017.01)
*G06V 20/56* (2022.01)

(52) U.S. Cl.
CPC ............. *G06V 20/56* (2022.01); *G06T 7/74* (2017.01); *G06T 2207/30252* (2013.01)

(58) Field of Classification Search
CPC ........ G06V 20/56; G06V 20/58; G06V 20/70; G06T 7/246; G06T 7/248; G06T 7/254;
(Continued)

(56) References Cited

U.S. PATENT DOCUMENTS 9,194,949 B2    11/2015    Becker et al.
9,562,778 B2    2/2017    Duhadway et al.
(Continued)

FOREIGN PATENT DOCUMENTS

DE    102012106932 A1    5/2014

OTHER PUBLICATIONS

"Extended European Search Report", EP Application No. 21190812. 4, Feb. 7, 2022, 11 pages.
(Continued)

*Primary Examiner* — Andrew W Johns
(74) *Attorney, Agent, or Firm* — Harness, Dickey & Pierce, P.L.C.

(57) ABSTRACT

A computer implemented method for determining an occupancy map in the vicinity of a vehicle comprises the following steps: successively acquiring sensor data of a sensor system, determining object detections based on the sensor data, overlaying the object detections in a spatial representation of the vicinity of the vehicle, defining, for an object detection of a first data acquisition process, an expectation area extending around the object detection, adjusting, if an object detection of a second data acquisition process is present within the expectation area, the position of the expectation area based on a difference between the position of the object detection of the first data acquisition process and the position of the object detection of the second data acquisition process, and removing an object detection of the expectation area from the occupancy map if no object detection can be determined in the expectation area for a predetermined number of successive data acquisition processes.

20 Claims, 6 Drawing Sheets

(58) Field of Classification Search
CPC .... G06T 7/70; G06T 7/73; G06T 7/74; G06T 2207/30252; G06T 2207/30261; G01C 21/3804; G05D 1/0231; G05D 1/0246; G05D 1/617; G05D 1/622; G05D 1/633; G05D 1/637

See application file for complete search history.

(56) References Cited

U.S. PATENT DOCUMENTS

| | | | |
|---|---|---|---|
| 9,594,378 B2 | 3/2017 | Laur et al. | |
| 10,345,107 B2 | 7/2019 | Laur et al. | |
| 2010/0235004 A1* | 9/2010 | Thind | G05B 15/02 700/277 |
| 2012/0310504 A1 | 12/2012 | Duhadway et al. | |
| 2013/0103298 A1 | 4/2013 | Becker et al. | |
| 2015/0022392 A1 | 1/2015 | Hegemann et al. | |
| 2015/0353083 A1 | 12/2015 | Hasberg et al. | |
| 2018/0188037 A1 | 7/2018 | Wheeler et al. | |
| 2019/0384302 A1 | 12/2019 | Silva et al. | |
| 2020/0103523 A1 | 4/2020 | Liu et al. | |
| 2020/0217943 A1 | 7/2020 | Pishehvari et al. | |
| 2020/0346662 A1* | 11/2020 | Suzuki et al. | B60W 60/00276 |
| 2022/0221866 A1* | 7/2022 | Yadmellat et al. | G05D 1/0214 |

OTHER PUBLICATIONS

Danescu, et al., "Modeling and Tracking the Driving Environment with a Particle Based Occupancy Grid", IEEE Transactions on Intelligent Transportation Systems, Dec. 1, 2011, 12 pages.

"Extended European Search Report", EP Application No. 20193680.4, Feb. 18, 2021, 9 pages.

Abdelgalil, et al., "Multi-Robot SLAM: An Overview", Jan. 2019, 11 pages.

Bouzouraa, "Fusion of Occupancy Grid Mapping and Model Based Object Tracking for Driver Assistance Systems using Laser and Radar Sensors", Jun. 2010, pp. 294-300.

Guidolini, et al., "Removing Movable Objects from Grid Maps of Self-Driving Cars Using Deep Neural Networks", Jul. 2019, 8 pages.

Holder, et al., "Real-Time Pose Graph SLAM based on Radar", Jun. 2019, 7 pages.

Javanmardi, "Autonomous vehicle self-localization based on abstract map and multichannel LiDAR in urban area", May 2018, 13 pages.

Li, et al., "Environment Mapping and Vehicle Localization with a High-Resolution Radar Prototype", Sep. 2019, 9 pages.

Pettersson, et al., "Estimation of Local Map from Radar Data", Masters Thesis, 2014—Retrieved at: http://liu.diva-portal.org/smash/get/diva2:761904/FULLTEXT01.pdf, 2014, 101 pages.

Pishehvari, et al., "Radar Scan Matching Using Navigation Maps", Feb. 2019, 8 pages.

Poggenhans, et al., "Precise Localization in High-Definition Road Maps for Urban Regions", Oct. 2018, 8 pages.

Saarinen, et al., "Normal Distributions Transform Occupancy Maps: Application to Large-Scale Online 3D Mapping", May 2013, pp. 2233-2238.

Sahdev, "Free Space Estimation Using Occupancy Grids and Dynamic Object Detection", Aug. 2017, 10 pages.

Schoen, et al., "Real-Time Radar SLAM", Jan. 2017, 10 pages.

Ward, et al., "Vehicle localization with low cost radar sensors", Jun. 2016, 8 pages.

* cited by examiner

VEHICLES, SYSTEMS AND METHODS FOR DETERMINING AN OCCUPANCY MAP OF A VICINITY OF A VEHICLE

CROSS-REFERENCE TO RELATED APPLICATIONS

This application claims priority to European Patent Application Number 21190812.4, filed Aug. 11, 2021 and claims priority to European Patent Application Number 20193680.4, filed Aug. 31, 2020, the disclosures of which are incorporated by reference in their entireties herein.

BACKGROUND

The present disclosure relates to vehicles, systems and methods for determining an occupancy map in the vicinity of a vehicle.

An occupancy map, also referred to as occupancy grid or occupancy map grid, is a map of cells containing information of the cell being occupied by some kind of object. The cells may have a fixed width, length and height. Occupancy maps are widely used in Advanced Driver Assistance Systems (ADAS) and autonomous driving applications, because an occupancy map can be interpreted as a map of obstacles around the vehicle. Each occupied cell may represent a non-drivable area. An inverted occupancy map can be interpreted as a free space map showing the drivable regions.

Usually, only stationary objects are listed in an occupancy map. Moving objects like other vehicles are not to form entries of an occupancy map. In practice, however, a reliable classification of object detections as "moving" or "stationary" is difficult. In particular, slow moving targets like pedestrians or temporarily stationary objects like vehicles stopping at traffic lights can be falsely identified as obstacles, for example due to inaccuracies in measurement (for example Doppler error) and computation. Such falsely identified obstacles result in ghost targets or traces in the occupancy map and impair the representation of the drivable space.

Accordingly, there is a need for efficient and reliable methods and systems for determining an occupancy map.

SUMMARY

The present disclosure provides a computer implemented method, a computer system and a non-transitory computer readable medium according to the independent claims. Embodiments are given in the dependent claims, the description and the drawings.

In one aspect, the present disclosure is directed at a computer implemented method for determining an occupancy map of a vicinity of a vehicle, the method comprising the following steps carried out by computer hardware components:
(i) successively acquiring sensor data of a sensor system arranged at the vehicle,
(ii) determining object detections based on the acquired sensor data,
(iii) overlaying the determined object detections in a spatial representation of the vicinity of the vehicle to determine the occupancy map,
(iv) defining, for at least one object detection of a first data acquisition process, an expectation area extending around the object detection,
(v) adjusting, if an object detection of a subsequent second data acquisition process is present within the expectation area and a predefined stop criterion is not fulfilled, the position of the expectation area based on a difference between the position of the object detection of the first data acquisition process and the position of the object detection of the second data acquisition process, and
(vi) removing at least one object detection of the expectation area from the occupancy map if no object detection can be determined in the expectation area for a predetermined number of successive data acquisition processes.

In other words, if in the first acquired sensor data a potential object or part of an object is detected, e.g., if it is determined that an object is potentially present or present with a predefined probability, then an expectation area extending around the respective object is created. In the course of further data acquisition processes, the expectation area is repositioned to follow the potentially present object. If the object disappears in later sensor data, the corresponding entry in the occupancy map is removed, because it is assumed that the object has moved out of the expectation area. The repositioning of the expectation area ensures that the focus is kept on the potential object.

It has been found that a repositioning and selective resetting of expectation areas as described herein provides a cleaned-up occupancy map which is at least essentially free from undesired ghost targets and traces. The application of a stop criterion avoids problems arising from continuously moving expectation areas, for example due to a slowly moving pedestrian.

The sensor system may comprise a radar sensor and/or a lidar sensor. The first and the second data acquisition process may correspond to successive scans or frames of the radar and/or lidar sensor. In the context of the present disclosure, an object detection corresponds to a detected surface spot of an object present in the vicinity of the vehicle.

The position of the expectation area may be adjusted in step (v) such that, after the adjustment, a centre of the expectation area is close to all accumulated occupancy probabilities. The adjustment can alternatively be such that the object detection of the subsequent second data acquisition process is centrally positioned in the adjusted expectation area. If the difference between the position of the object detection of the first data acquisition process and the position of the object detection of the second data acquisition process is zero, no adjustment is necessary.

In step (vi), any object detections or entries located in the expectation area may be removed from the occupancy map. Further, the step (iv) may be carried out for each object detection of the first data acquisition process.

The method may further include one or more of the following features:

The object detections may be respectively determined based on an occupancy probability which is updated after each data acquisition process. The occupancy probability may be defined as a log odds ratio. Determining object detections in step (ii) may comprise determining peaks of the log odds ratio. It may be determined that no object detection can be determined within the expectation area if no occupancy probability in the expectation area exceeds a predefined detection threshold. The stop criterion may be defined based on a cumulative occupancy probability of the expectation area. The stop criterion may be fulfilled if the cumulative occupancy probability of the expectation area exceeds a predefined trace threshold. Removing the at least one object detection of the expectation area in step (vi) may comprise setting the occupancy probabilities of the expectation area to zero. The object detections determined in step (ii) may be classified as either moving or stationary. Only object detections classified as stationary may be overlaid in the spatial representation of the vicinity of the vehicle in step (iii). The at least one object detection which has been removed from the occupancy map in step (vi) may be stored in a trace map separate from the occupancy map. A sanity check may be performed if no object detection can be determined in the expectation area for a predetermined number of successive data acquisition processes after the first data acquisition process and the object detection may be only removed from the occupancy map if the result of the sanity check is positive. The sanity check may comprise an occlusion check and the result of the sanity check may be negative if the expectation area is occluded by another object detection or another expectation area.

According to an embodiment, the object detections are respectively determined based on an occupancy probability which is updated after each data acquisition process. The occupancy map may comprise a plurality of cells, wherein an occupancy probability is assigned to each of the cells.

It is to be understood that the occupancy map may be represented by a matrix (for a two-dimensional occupancy map) or a tensor (for a three-dimensional occupancy map), wherein each of the two dimensions of the matrix (or each of the three dimensions of the tensor) corresponds to a dimension in space. An entry of a cell of the matrix or the tensor at a specific position may correspond to information whether or not an object is potentially present at that location and may be presented by a Boolean value such as "true" for "object present" and "false" for "object not present". Alternatively, the probability may be indicated by a number between 0 and 1 or between 0% and 100%.

According to another aspect, the occupancy probability is defined as a log odds ratio, e.g., as the logarithm, for example the natural logarithm, of the ratio between the probability of the cell being occupied to the probability of the cell not being occupied. Compared to a raw probability value, the log odds ratio can be easily updated with new data.

According to another aspect, determining object detections in step (ii) comprises determining peaks of the log odds ratio. In other words, an object detection may be assumed to be present whenever a log odds peak value occurs in an update cycle. A peak value of the updated log odds ratio corresponds to an intensity peak of the current sensor output.

According to another aspect, no object detection can be determined in the expectation area if no occupancy probability in the expectation area exceeds a predefined detection threshold, e.g., if all occupancy probabilities of the cells of the expectation area respectively don't exceed the predefined detection threshold. The detection threshold may be 0.5. A reset counter may be incremented when no object detection can be determined in the expectation area, e.g., when no log odds ratio update is found.

According to another aspect, the step (vi) includes checking, for each data acquisition process, if a log odds ratio of the expectation area exceeds a predefined detection threshold. For example, once the expectation area has been defined, it may be checked for each subsequent data acquisition process, if the following expectation criterion is fulfilled: $\forall_{scan} \log(odds)_{mi} > 0.5 \in$ expectation area, wherein scan refers to a data acquisition process and 0.5 is the detection threshold. The detection threshold may be selected in dependence of the velocity of the host vehicle. For example, the detection threshold may be high for a slow velocity and low for a high velocity.

According to another aspect, the stop criterion is defined based on a cumulative occupancy probability of the expectation area. The cumulative occupancy probability of the expectation area may be the sum of probabilities of all cells of the expectation area, e.g., if an expectation area is overfilled with high probability entries due to traces of a moving target, the repositioning is stopped. It has turned out that such a stop criterion enables a reliable removal of slow-moving targets such as pedestrians from the occupancy map.

According to another aspect, the stop criterion is fulfilled if the cumulative occupancy probability of the expectation area exceeds a predefined threshold.

It may be checked if the stop criterion is fulfilled by summing up all object detections that are inside the expectation area and checking if the determined sum exceeds a predefined threshold. For example, it may be checked if the following stop criterion is fulfilled: $\Sigma_{expectation\ area} \log(odds) > P_{threshold}$, wherein $P_{threshold}$ is the predefined threshold related to the stop criterion. An exemplary value for $P_{threshold}$ is 12. For highly sensitive radar systems, the value may be smaller and vice versa.

According to another aspect, removing the at least one object detection of the expectation area in step (vi) comprises setting the occupancy probabilities of the expectation area, e.g., of all cells of the expectation area, to zero. Thus, undesired ghost entries, traces and the like are deleted.

According to another aspect, the object detections determined in step (ii) are classified as either moving or stationary and only object detections classified as stationary are overlaid in the spatial representation of the vicinity of the vehicle in step (iii). Due to inaccuracies of the classifier, such object detections may in fact correspond to moving objects, in particular to slowly moving objects or to temporarily moving objects. Such entries of the occupancy map may be subsequently removed from the occupancy map by a method as described herein.

According to another aspect, the at least one object detection which has been removed from the occupancy map in step (vi) is stored in a trace map separate from the occupancy map. Such a trace map may be used, for example, for a selective tracking of slowly moving pedestrians by means of a tracker and/or for a training of a machine learning algorithm able to identify pedestrians.

According to another aspect, a sanity check is performed if no object detection can be determined in the expectation area for a predetermined number of successive data acquisition processes after the first data acquisition process and the object detection is only removed from the occupancy map if the result of the sanity check is positive. Due to the complexity of the environment, there is a certain risk that no updated object detection is found in an expectation area despite an actual presence of an object. The sanity check avoids false removals of entries from the occupancy map.

According to another aspect, the sanity check comprises an occlusion check and the result of the sanity check is negative if the expectation area is occluded by another object detection or another expectation area. If an area is located behind a newly detected object from the perspective of the corresponding sensor, objects actually present in that area cannot be detected due to occlusion. The sanity check provides for a keeping of information related to the occluded area.

According to another aspect, in step (i) the distance of the object detection to a previously defined expectation area is determined and a further expectation area is only defined if the determined distance exceeds a predefined distance threshold. It has been found that such a measure can control an area overlap to be minimal in order to not create unnecessary expectation areas.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the computer system may be configured to be disposed in a vehicle.

In another aspect, the present disclosure is directed at a vehicle comprising a computer system as described herein and the sensor system. The sensor system may comprise several short-range radar sensors and at least one medium range radar sensor.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

In another aspect, the instructions may, when executed by at least one processor, cause the processor to perform the computer implemented method described herein.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
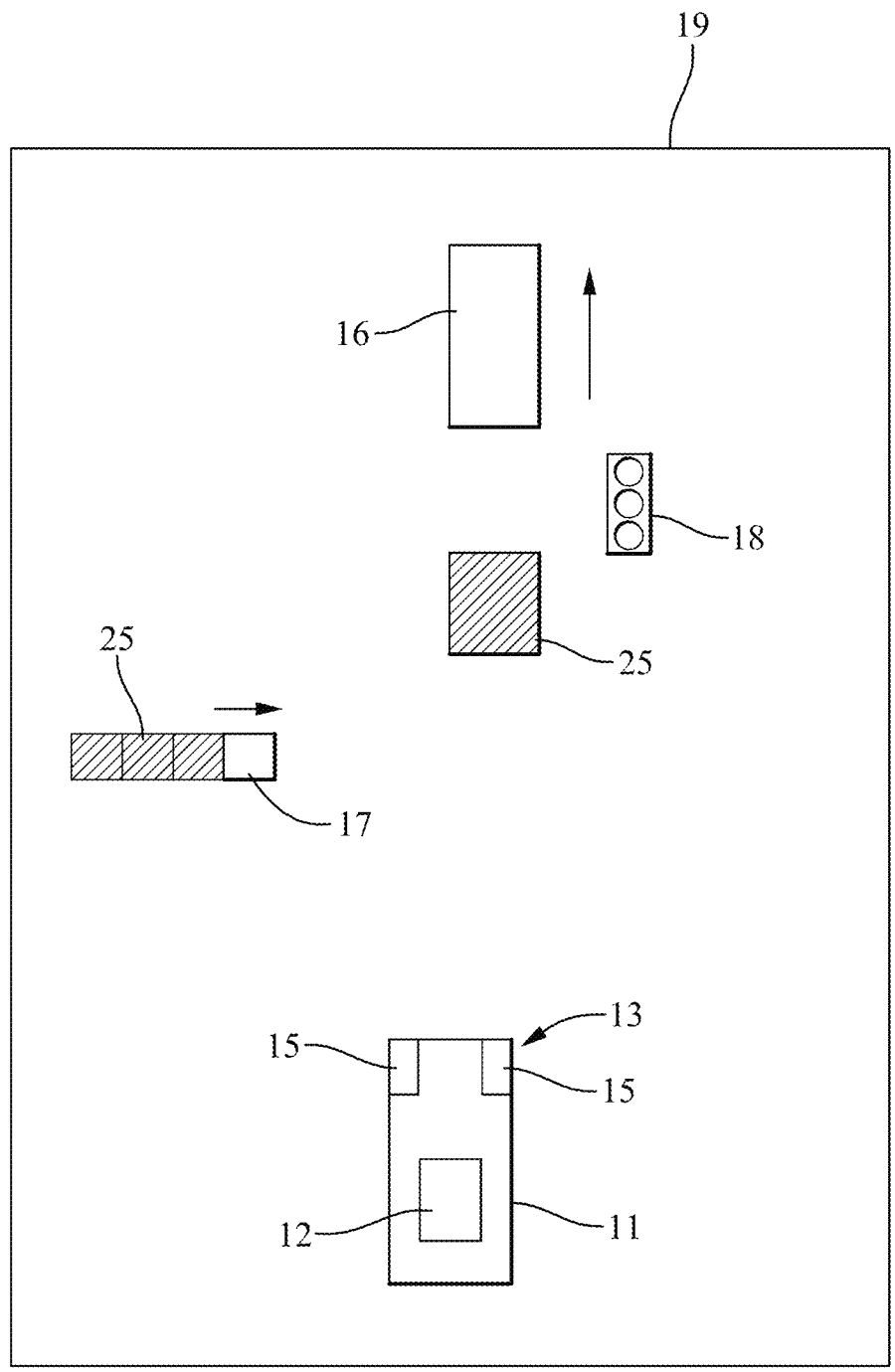
FIG. 1 a vicinity of a host vehicle in a schematic top view.

FIG. 1 depicts, in a top view, a motor vehicle or host vehicle 11 including a computer system 12 and a sensor system 13 connected to the computer system 12. The sensor system 13 includes a plurality of sensors 15 configured to scan the vicinity of the host vehicle 11 for objects such as other vehicles 16, pedestrians 17 or stationary objects like traffic lights 18. The sensors 15 of the sensor system 13 may be radar (radio detection and ranging) sensors, lidar (light detection and ranging) sensors and/or time-of-flight cameras. The computer system 12 receives data from the sensors 15 and provides an "advanced driver assistance" functionality or an autonomous driving functionality based on an evaluation of the received data.

According to various embodiments, an occupancy map 19 of the vicinity of the host vehicle 11 may be determined by accumulating readings from the sensors 15 of the sensor system 13 and transforming the accumulated sensor readings to probabilities over time. The occupancy map 19 may include a two-dimensional or three-dimensional grid of cells (not shown), wherein an occupancy probability is assigned to each of the cells, as is known in the art. The occupancy probability may be updated after each data acquisition process, e.g., after each frame or scan of the sensors 15. The occupancy probability may be indicated as a log odds ratio.

The occupancy map 19 shows obstacles in form of stationary objects and thus also shows the drivable space, e.g., the space which is free from obstacles. Generally, only stationary objects are to be indicated in the occupancy map 19. Therefore, the detected objects may be classified as either moving objects or stationary objects. Entries of the occupancy map 19, e.g., cells identified as "probably occupied", are created for stationary objects, but not for moving objects. According to various embodiments, a classifier based on an artificial neural network or on a Support Vector Machine may be used for the classification. Azimuth based Doppler calculations may be used for stationary/moving classification.

It is possible that a slowly moving target like a pedestrian 17 is not properly identified as a moving object due to inaccuracies in measurement and/or computation, which may result, as schematically shown in FIG. 1, in a trace 25 present in the occupancy map 19. Also, a vehicle 16 stopping at traffic lights 18 may be classified as a stationary object, despite a later movement. The space previously occupied by this vehicle 16 continues to exist in the occupancy map 19 as a trace 25. Obviously, such traces 25 are undesired because they lead to a confusion of control modules which use the information relating to the drivable space included in the occupancy map 19 as an input.

Figure 2:
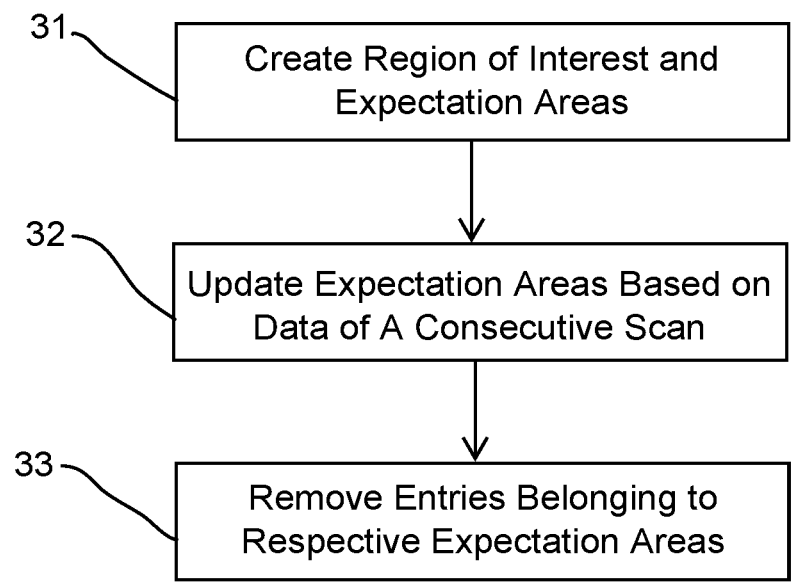
FIG. 2 a flow diagram illustrating steps of a method for determining an occupancy map in the vicinity of the host vehicle according to various embodiments.
Figure 3:
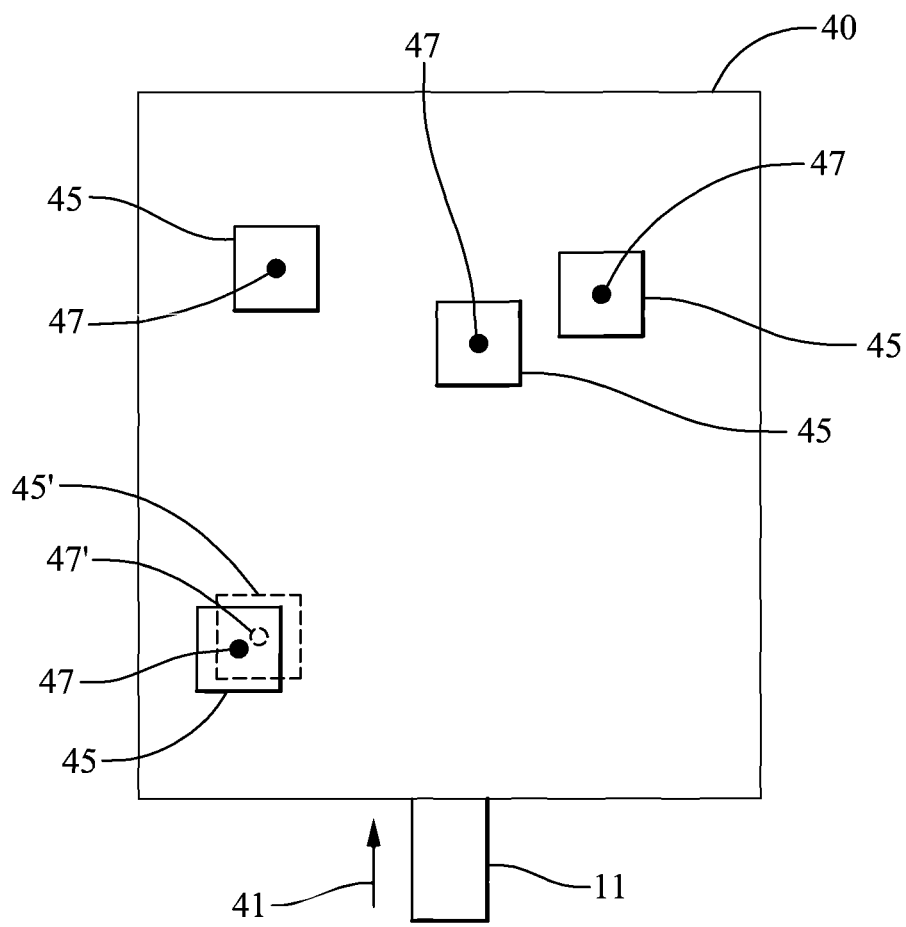
FIG. 3 a region of interest of the vicinity of the host vehicle according to FIG. 1 including expectation areas extending around object detections.

Therefore, according to various embodiments, the computer system 12 is configured to clean the occupancy map 19 from traces 25 as described below with reference to FIG. 2 showing a flow diagram and FIG. 3 showing a region of interest 40 located in front of the host vehicle 11 with respect to a normal or designated driving direction 41 and expectation areas 45 extending around object detections 47 within the region of interest 40.

In a first step 31, the region of interest 40 and the expectation areas 45 are created. For each object detection 47 determined in a current scan of the sensors 15 (FIG. 1), an individual expectation area 45 having a fixed size (in pixels or cells), for example 10×10 pixels, is created. Each of the object detections 47 is located centrally within the corresponding expectation area 45.

An object detection 47 corresponds to a peak of the log odds ratio. Specifically, an expectation area 45 is created when a peak of the log odds ratio occurs in a specific scan and the peak does not belong to an already existing expectation area 45. The expectation area 45 may be positioned such that the peak of the updated log odds ratio is located in the center of the expectation area 45.

The distance of an object detection 47 to a previously defined expectation area 45 may be determined. The further expectation area 45 may only be created if the determined distance exceeds a predefined distance threshold in order to prevent the creation of unnecessary expectation areas 45.

In a step 32, the expectation areas 45 are updated based on data of a consecutive scan. If an object detection 47 belonging to an existing expectation area 45 is found in the consecutive scan, the position of the expectation area 45 is adjusted such that the center of the adjusted expectation area 45' is close to the accumulated occupancy probabilities.

An object detection 47 belonging to an existing expectation area 45 is found if at least one expectation criterion is fulfilled. The expectation criterion may be fulfilled if the log odds ratio for each cell of the expectation area 45 is greater than a predefined detection threshold, for example 0.5. If the expectation criterion is not fulfilled, a reset counter is incremented for the corresponding expectation area 45.

The repositioning of the expectation area 45 is stopped if a predefined stop criterion is fulfilled. The stop criterion may be defined based on a cumulative occupancy probability of the expectation area 45. For example, the stop criterion may be fulfilled if the sum of the occupancy probabilities of all cells of the respective expectation area 45 exceeds a predefined trace threshold.

If the expectation criterion for a specific expectation area 45 is not fulfilled for a predefined number of scans, for example 6 scans, a sanity check including an occlusion check is performed. Based on the sanity check, the entries of the occupancy map located in the expectation area 45 are kept or removed. Specifically, if the sanity check is negative, the entries belonging to the expectation area 45 are kept. If the sanity check is positive, it is assumed that the entries belonging to the expectation area 45 are traces 25 (FIG. 1) and, in a step 33, any entries belonging to the respective expectation area 45 are removed. In other words, the occupancy probabilities of the cells of the expectation area 45 are set to zero. The removed entries may be stored in a computer storage medium.

Figure 4:
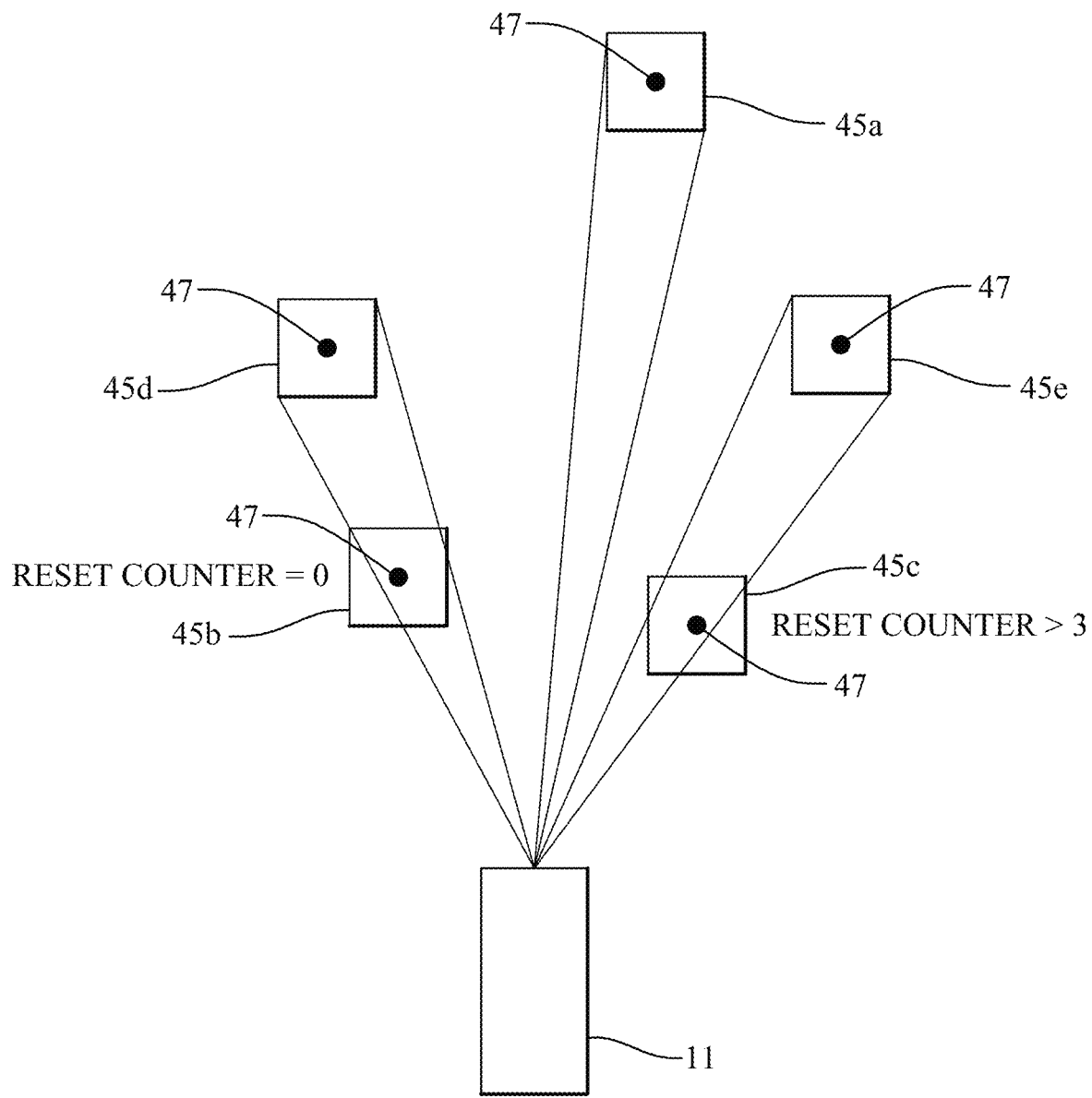
FIG. 4 an illustration of an occlusion of expectation areas by other expectation areas.

The sanity check includes an occlusion check as exemplarily shown in FIG. 4. The upper (farthest) expectation area 45a, the lower (nearest) left expectation area 45b and the lower (nearest) right expectation area 45c are not occluded by any other expectation area 45. In contrast, the two intermediate expectation areas 45d, 45e are occluded by the lower expectation areas 45b, 45c, respectively. The occlusion check includes a step of determining if an object detection 47 to be removed is occluded by a newly occurred object detection 47. In case of an occlusion, it is further checked, by means of the reset counter of the corresponding expectation area 45, if the occluding object detection 47 is likely to be a ghost detection itself. If this is the case, for example as the reset counter of the corresponding expectation area 45c exceeds 3, the object detection 47 is removed despite the occlusion. If the reset counter is low, for example 0, the occluded object detection 47 is kept. Thus, in the situation according to FIG. 4, the upper central expectation area 45a and the right intermediate expectation area 45e are removed, while the left intermediate expectation area 45b is kept.

Figure 5:
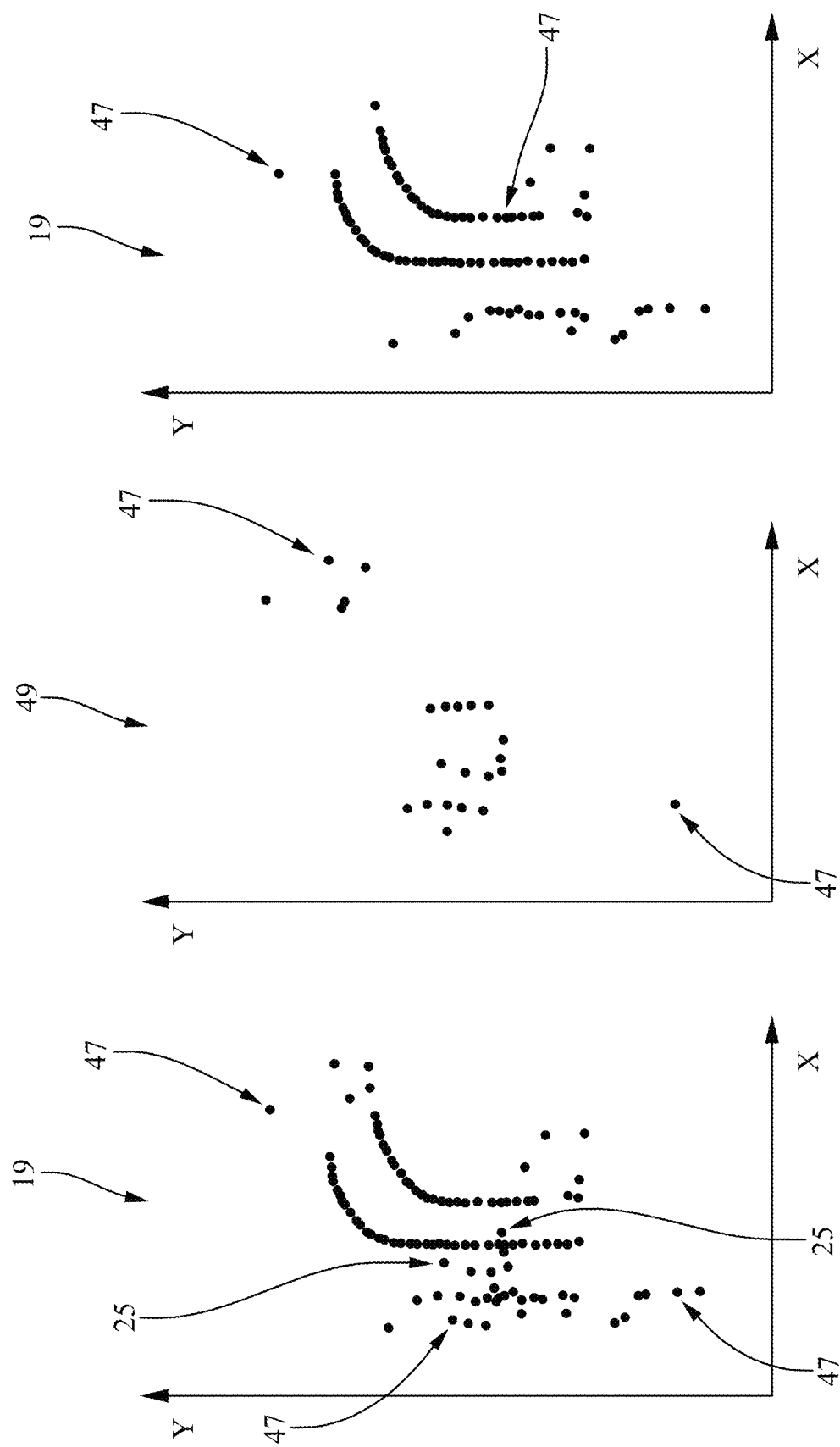
FIG. 5 a comparison of occupancy maps before and after a removal of traces according to various embodiments as well as a trace map.

In the left panel of FIG. 5, an exemplary occupancy map 19 is shown before a removal of object detections 47 as described above. In the right panel of FIG. 5, the occupancy map 19 is shown after a removal of object detections 47 as described above. It can be understood that the occupancy map 19 shown in the right panel of FIG. 5 has been cleaned from traces 25, ghost targets and the like. In the central panel of FIG. 5, a trace map 49 including only the removed object detections 47 is shown. The positional coordinates x, y indicated in FIG. 5 refer to a lateral (x) and a longitudinal (y) distance from a predefined reference point in m.

The embodiments described herein enable a fast, simple, and instantaneous trace detection in an occupancy map 19. The computational effort is only little. Traces, multi-paths, ghost targets and the like are effectively deleted.

Figure 6:
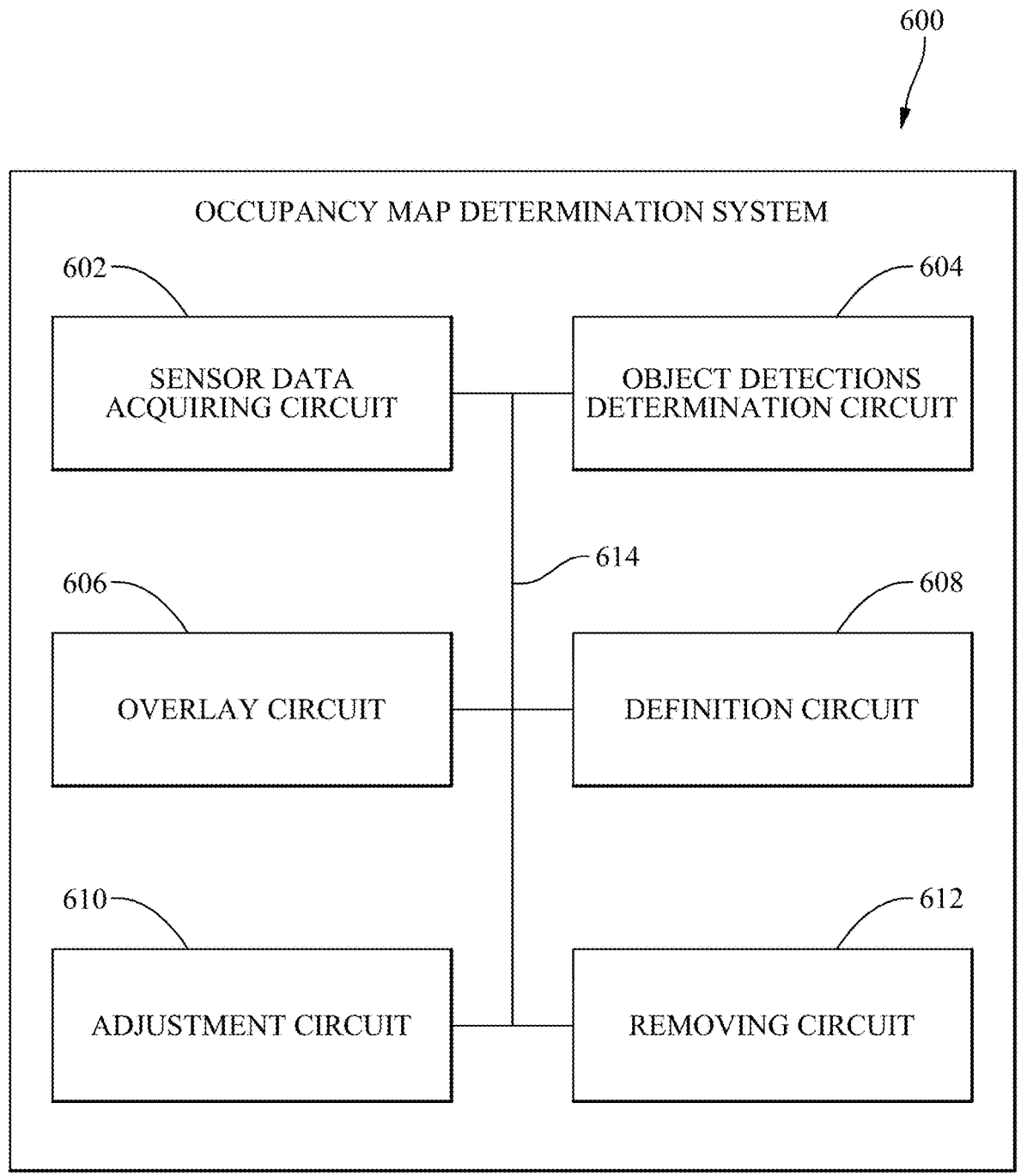
FIG. 6 an occupancy map determination system according to various embodiments.

FIG. 6 shows an occupancy map determination system 600 according to various embodiments. The occupancy map determination system 600 may include a sensor data acquiring circuit 602, an object detections determination circuit 604, an overlay circuit 606, a definition circuit 608, an adjustment circuit 610, and a removing circuit 612. The occupancy map determination system 600 may be a system for determining an occupancy map of a vicinity of a vehicle.

The sensor data acquiring circuit 602 may be configured to successively acquire sensor data of a sensor system arranged at the vehicle.

The object detections determination circuit 604 may be configured to determine object detections based on the acquired sensor data.

The overlay circuit 606 may be configured to overlay the determined object detections in a spatial representation of the vicinity of the vehicle to determine the occupancy map.

The definition circuit 608 may be configured to define, for at least one object detection of a first data acquisition process, an expectation area extending around the object detection.

The adjustment circuit 610 may be configured to adjust, if an object detection of a subsequent second data acquisition process is present within the expectation area and a predefined stop criterion is not fulfilled, the position of the expectation area based on a difference between the position of the object detection of the first data acquisition process and the position of the object detection of the second data acquisition process.

The removing circuit 612 may be configured to remove at least one object detection of the expectation area from the occupancy map if no object detection can be determined in the expectation area for a predetermined number of successive data acquisition.

The sensor data acquiring circuit 602, the object detections determination circuit 604, the overlay circuit 606, the definition circuit 608, the adjustment circuit 610, and the removing circuit 612 may be coupled with each other, e.g. via an electrical connection 614, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 7:
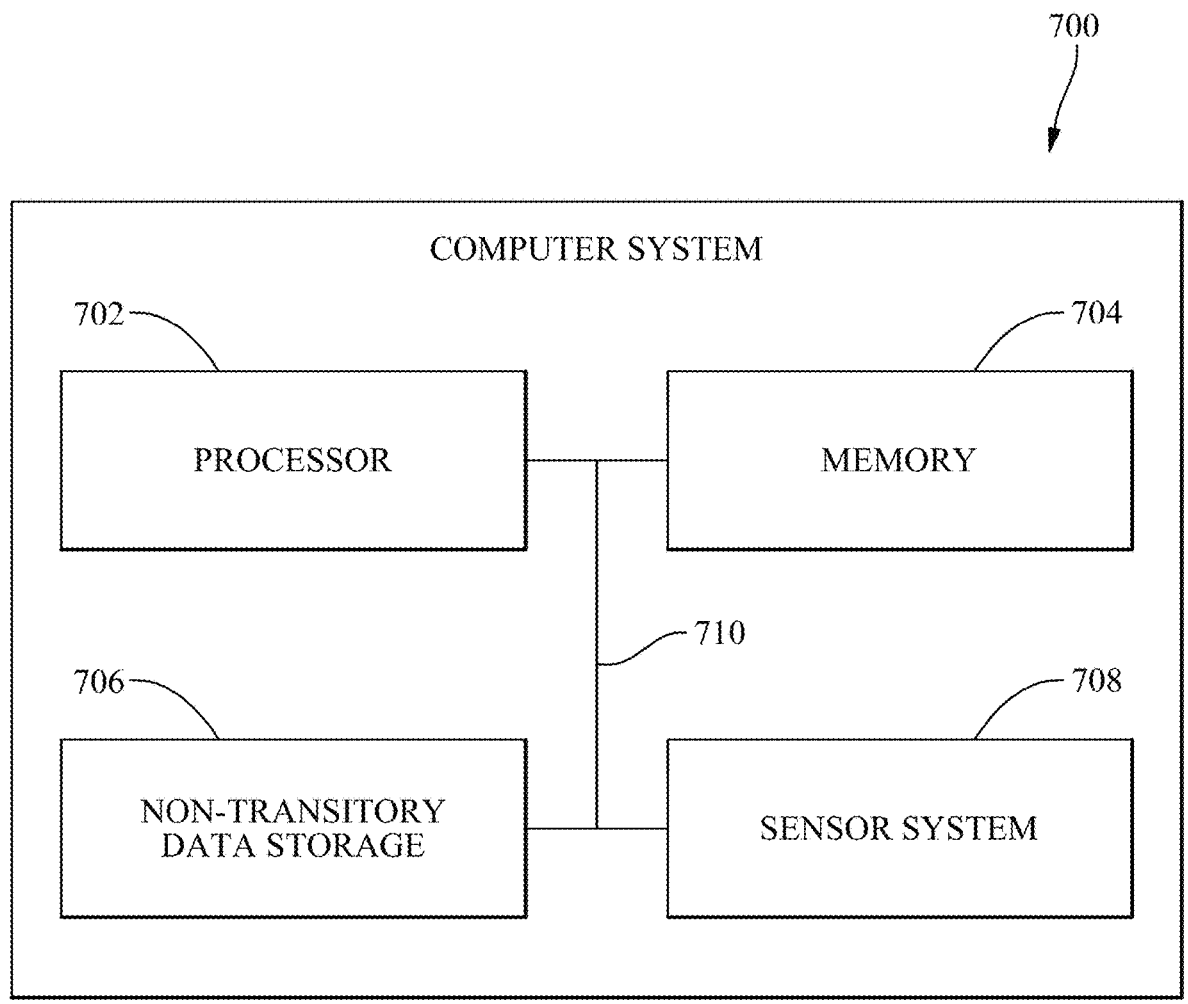
FIG. 7 a computer system with a plurality of computer hardware components configured to carry out steps of a computer implemented method for determining an occupancy map according to various embodiments.

FIG. 7 shows a computer system 700 with a plurality of computer hardware components configured to carry out steps of a computer implemented method for determining an occupancy map of a vicinity of a vehicle according to various embodiments. The computer system 700 may include a processor 702, a memory 704, and a non-transitory data storage 706. A sensor system 708 may be provided as part of the computer system 700 (like illustrated in FIG. 7) or may be provided external to the computer system 700.

The processor 702 may carry out instructions provided in the memory 704. The non-transitory data storage 706 may store a computer program, including the instructions that may be transferred to the memory 704 and then executed by the processor 702. The sensor system 708 may be used to acquire sensor data as described above.

The processor 702, the memory 704, and the non-transitory data storage 706 may be coupled with each other, e.g. via an electrical connection 710, such as e.g. a cable or a computer bus or via any other suitable electrical connection to exchange electrical signals. The sensor system 708 may be coupled to the computer system 700, for example via an external interface, or may be provided as parts of the computer system (in other words: internal to the computer system, for example coupled via the electrical connection 710).

The terms "coupling" or "connection" are intended to include a direct "coupling" (for example via a physical link) or direct "connection" as well as an indirect "coupling" or indirect "connection" (for example via a logical link), respectively.

It is to be understood that what has been described for one of the methods above may analogously hold true for the occupancy map determination 600 and/or for the computer system 700.

What is claimed is:

1. A computer-implemented method for determining an occupancy map of a vicinity of a vehicle, the method comprising:
   (i) successively acquiring sensor data from a sensor system of the vehicle;
   (ii) determining object detections based on the acquired sensor data;
   (iii) overlaying the determined object detections in a spatial representation of the vicinity of the vehicle to determine the occupancy map;
   (iv) defining, for at least one of the object detections of a first data acquisition process, a position of an expectation area extending around the at least one of the object detections;
   (v) adjusting, if an object detection of a second data acquisition process is present within the expectation area and a predefined stop criterion is not fulfilled, the position of the expectation area based on a difference between a position of the at least one of the object detections of the first data acquisition process and a position of the object detection of the second data acquisition process; and
   (vi) removing at least one of the at least one of the object detections of the expectation area from the occupancy map if no object detection can be determined in the expectation area for a predetermined number of successive data acquisition processes.

2. The computer-implemented method of claim 1, wherein the determining the object detections includes determining the object detections respectively based on an occupancy probability that is updated after each data acquisition process.

3. The computer-implemented method of claim 2, wherein the occupancy probability is defined as a log odds ratio; and
   wherein the determining the object detections comprises determining peaks of the log odds ratio.

4. The computer-implemented method of claim 3, wherein the defining the position of the expectation area comprises checking, for each data acquisition process, if a log odds ratio of the expectation area exceeds a predefined detection threshold.

5. The computer-implemented method of claim 2, wherein in the defining the position of the expectation area comprises determining that no object detection is in the expectation area if no occupancy probability in the expectation area exceeds a predefined detection threshold.

6. The computer-implemented method of claim 2, wherein the stop criterion is defined based on a cumulative occupancy probability of the expectation area.

7. The computer-implemented method of claim 6, wherein the stop criterion is fulfilled if the cumulative occupancy probability of the expectation area exceeds a predefined threshold.

8. The computer-implemented method of claim 2, wherein the removing the at least one object detection of the expectation area comprises setting the occupancy probabilities of the expectation area to zero.

9. The computer-implemented method of claim 1, further comprising checking if the stop criterion is fulfilled by determining a sum of object detections that are inside the expectation area and checking if the sum of object detections exceeds a predefined threshold.

10. The computer-implemented method of claim 1, wherein the determining the object detections comprises classifying the object detections as either moving or stationary, and
    wherein the overlaying the object detections comprises overlaying the object detections that are classified as stationary in the spatial representation of the vicinity of the vehicle.

11. The computer-implemented method of claim 1, wherein the removing the at least one object detection of the expectation area from the occupancy map comprises storing the at least one object detection of the expectation area in a trace map separate from the occupancy map.

12. The computer-implemented method of claim 1, further comprising:
    performing a sanity check if no object detection is determined in the expectation area for a predetermined number of successive data acquisition processes after the first data acquisition process, and
    wherein the removing the at least one object detection of the expectation area from the occupancy map if there is a positive result from performing the sanity check.

13. The computer-implemented method of claim 12, wherein the sanity check comprises an occlusion check, the result is positive or negative based on whether the expectation area is or is not occluded by another object detection or another expectation area.

14. A computer system, the computer system comprising a plurality of computer hardware components configured to:
    (i) successively acquire sensor data from a sensor system of a vehicle;
    (ii) determine object detections based on the acquired sensor data;
    (iii) overlay the determined object detections in a spatial representation of a vicinity of the vehicle to determine an occupancy map;
    (iv) define, for at least one of the object detections of a first data acquisition process, a position of an expectation area extending around the at least one of the object detections;
    (v) adjust, if an object detection of a second data acquisition process is present within the expectation area and a predefined stop criterion is not fulfilled, the position of the expectation area based on a difference between a position of the at least one of the object detections of the first data acquisition process and a position of the object detection of the second data acquisition process; and (vi) remove at least one of the at least one of the object detections of the expectation area from the occupancy map if no object detection can be determined in the expectation area for a predetermined number of successive data acquisition processes.

15. The computer system of claim 14, wherein the computer hardware components are further configured to (ii) determine the object detections respectively based on peaks of a log odds ratio that is updated after each data acquisition process.

16. The computer system of claim 15, wherein the computer hardware components are further configured to (vi) remove the at least one of the at least one of the object detections of the expectation area from the occupancy map by checking, for each data acquisition process, if a log odds ratio of the expectation area exceeds a predefined detection threshold.

17. The computer system of claim 14, wherein the stop criterion is defined based on a cumulative occupancy probability of the expectation area exceeding a predefined threshold.

18. The computer system of claim 14, wherein the computer hardware components are further configured to (vi) remove the at least one object detection of the expectation area from the occupancy map by storing the at least one object detection of the expectation area in a trace map separate from the occupancy map.

19. The computer system of claim 14, wherein the computer system is configured to be disposed within the vehicle.

20. A non-transitory computer readable medium comprising instructions that, when executed by at least one processor, causes the processor to:

(i) successively acquire sensor data from a sensor system of a vehicle;

(ii) determine object detections based on the acquired sensor data;

(iii) overlay the determined object detections in a spatial representation of a vicinity of the vehicle to determine an occupancy map;

(iv) define, for at least one of the object detections of a first data acquisition process, a position of an expectation area extending around the at least one of the object detections;

(v) adjust, if an object detection of a second data acquisition process is present within the expectation area and a predefined stop criterion is not fulfilled, the position of the expectation area based on a difference between a position of the at least one of the object detections of the first data acquisition process and a position of the object detection of the second data acquisition process; and (vi) remove at least one of the at least one of the object detections of the expectation area from the occupancy map if no object detection can be determined in the expectation area for a predetermined number of successive data acquisition processes.

* * * * *